United States Patent
Hecker et al.

(10) Patent No.: US 10,728,094 B2
(45) Date of Patent: Jul. 28, 2020

(54) CONTROL TRAFFIC IN SOFTWARE DEFINED NETWORKS

(71) Applicant: Huawei Technologies Co., Ltd., Shenzhen (CN)

(72) Inventors: Artur Hecker, Munich (DE); Zoran Despotovic, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 70 days.

(21) Appl. No.: 15/965,570

(22) Filed: Apr. 27, 2018

(65) Prior Publication Data

US 2018/0248755 A1    Aug. 30, 2018

Related U.S. Application Data

(63) Continuation of application No. PCT/EP2015/074960, filed on Oct. 28, 2015.

(51) Int. Cl.
*H04L 12/24* (2006.01)
*H04L 12/751* (2013.01)
(Continued)

(52) U.S. Cl.
CPC ...... *H04L 41/0816* (2013.01); *H04L 41/0668* (2013.01); *H04L 45/02* (2013.01);
(Continued)

(58) Field of Classification Search
None
See application file for complete search history.

(56) References Cited

U.S. PATENT DOCUMENTS 6,496,477 B1 * 12/2002 Perkins ............... H04L 45/00
                                                 370/228
6,785,277 B1 *  8/2004 Sundling ............ H04L 45/02
                                                 370/389
(Continued)

FOREIGN PATENT DOCUMENTS

CN    103929333 A    7/2014
CN    104301146 A    1/2015
(Continued)

OTHER PUBLICATIONS

Sharma et al., "Enabling Fast Failure Recovery in OpenFlow Networks", 2011 8th International Workshop on the Design of Reliable Communication Networks (DRCN), 2011 IEEE, 8 pages.
(Continued)

*Primary Examiner* — Xavier S Wong
(74) *Attorney, Agent, or Firm* — Slater Matsil, LLP (57) ABSTRACT

An embodiment first network node has a data flow table identifying forwarding rules to be applied to incoming data packets. The first network node is configured to allow for manipulation of the data flow table via control messages received via a control connection to a controller. The first network node is further configured to determine an occurrence of a network event or compliance with a condition specified by the controller. The first network node is further configured: to establish a control connection to a second network node in case that the network event occurs or the condition is met and to exchange control messages with the second network node via the control connection.

17 Claims, 5 Drawing Sheets

(51) Int. Cl.
*H04L 12/707* (2013.01)
*H04L 12/721* (2013.01)
*H04L 12/741* (2013.01)

(52) U.S. Cl.
CPC .............. *H04L 45/22* (2013.01); *H04L 45/38* (2013.01); *H04L 45/54* (2013.01)

(56) References Cited

U.S. PATENT DOCUMENTS

| | | | |
|---|---|---|---|
| 2002/0023210 A1* | 2/2002 | Tuomenoksa | H04L 12/4641 713/161 |
| 2013/0208621 A1 | 8/2013 | Manghirmalani et al. | |
| 2014/0211661 A1 | 7/2014 | Gorkemli et al. | |
| 2015/0146525 A1 | 5/2015 | Shibata et al. | |
| 2016/0112248 A1* | 4/2016 | Torigoe | H04L 12/6418 370/218 |

FOREIGN PATENT DOCUMENTS

| | | |
|---|---|---|
| EP | 2800304 A1 | 11/2014 |
| WO | 2012023292 A1 | 2/2012 |

OTHER PUBLICATIONS

Kamamura et al., "Autonomous Fast Rerouting for Software Defined Network," NTT Network Service System Laboratories, NTT Corporation, Oct. 29, 2012, 20 pages.

Zhang et al., "On Resilience of Split-Architecture Networks," Ericsson Research, 2011, 6 pages.

Kempf et al., "Scalable Fault Management for OpenFlow," Software Defined Networks, sponsored by the SPARC FP7 EU, 2012 IEEE, 5 pages.

Open Networking Foundation, "OpenFlow Switch Specification," Version 1.4.0 (Wire Protocol 0x05), Oct. 14, 2013,ONF TS-012, 206 pages.

McKeown et al., "OpenFlow: Enabling Innovation in Campus Networks," ACM SIGCOMM Computer Communication Review, vol. 38, No. 2, Apr. 2008, 6 pages.

K. Fall et al., "TCP/IP illustrated, vol. 1: The protocols, Second Edition," Addison—Wesley, 2011, 1059 pages.

D. Katz et al., "Bidirectional Forwarding Detection (BFD)," Internet Engineering Task Force (IETF), rfc5880, Category: Standards Track, Jun. 2010, 49 pages.

D. Katz et al., "Bidirectional Forwarding Detection (BFD) for IPv4 and IPv6 (Single Hop)," Internet Engineering Task Force (IETF), rfc5881, Category: Standards Track, Jun. 2010, 7 pages.

* cited by examiner

CONTROL TRAFFIC IN SOFTWARE DEFINED NETWORKS

CROSS-REFERENCE TO RELATED APPLICATIONS

This application is a continuation of International Application No. PCT/EP2015/074960, filed on Oct. 28, 2015, the disclosure of which is hereby incorporated by reference in its entirety

TECHNICAL FIELD

The present invention relates to software defined networks. In particular, the present invention relates to control traffic in software defined networks.

BACKGROUND

The design and management of software defined networks (SDN) may be based on separating the network forwarding plane from the network control plane. Moreover, the network control plane may be centralized by having one or more SDN controllers which order network nodes via control connections to populate their data flow tables with forwarding rules to be applied to incoming data packets.

SUMMARY

While centralizing the network forwarding plane may streamline the development of control plane protocols, it may place a burden to the establishment of new control connections. For, example, establishing new control connections may require that each network node involved is either pre-configured or can be reached over an existing control connection. Hence, when integrating new network nodes or when trying to recover from failed control connections, this prerequisite may be a drawback. Moreover, large networks may have to cope with a considerable delay in network reconfiguration when all decisions have to be taken and transmitted by a central controller, even more when the decisions relate to unpredictable or sudden events or changes in the network state.

Aspects of embodiments of the present invention which relate to the transmission of control messages in software defined networks are provided to at least partially overcome these drawbacks.

According to a first aspect, there is provided a first network node having a data flow table identifying forwarding rules to be applied to incoming data packets. The first network node is configured to allow for manipulation of the data flow table via control messages received via a control connection to a controller. The first network node is further configured to determine an occurrence of a network event or compliance with a condition specified by the controller. The first network node is further configured to establish a control connection to a second network node when the network event occurs or the condition is met and to exchange control messages with the second network node via the control connection.

In this regard, it is noted that the term "control message" as used throughout the description and the claims is intended to be understood broadly and includes any message that originates from the controller and is intended for a specific network node or vice versa; the control message may control the transmission paths in the network, trigger a reconfiguration, or update of a data flow table of a network node.

Moreover, the term "control connection" as used throughout the description and the claims is intended to be understood broadly and particularly relates to a transmission path ruled by the controller, which is used to exchange control messages with the controller and relates to any end-to-end connection or transmission path through which control messages are transmitted. Furthermore, the term "end-to-end connection" as used throughout the description and the claims relates to a transmission path defined by network nodes that do not need to or even cannot parse the message by design and hence forward the message without regard for its content, for example, by simply choosing a transmission path on basis of a message agnostic forwarding rule. An example message agnostic forwarding rule may define that all data packets received at a particular input port are copied to a particular output port.

Accordingly, network reconfiguration may be accelerated by the network-node-initiated exchange of control messages between the network nodes, which is particularly useful if the controller is located remotely from a reconfiguration site.

In a first implementation form of the first aspect, the first network node is further configured to use the second network node to relay information from the first network node to the controller, the information being related to the network event, originating at the first network node, to the controller, or to send to the second network node a controller-authorized request for manipulation of a data flow table of the second network node.

Hence, control messages of the first network node which are intended for the SDN controller may be routed/re-routed to the second network node which then handles the control traffic of the first network node. Moreover, relaying may proceed until the controller chooses a new path for the control connection between the first network node and the controller or confirms the existing path as the new path for the control connection between the first network node and the controller.

In particular, the controller may be configured to issue a control message that is relayed by the second network node to the first network node and which indicates a new (end-to-end) control connection between the first network node and the controller, wherein the new control connection may be based, for example, on a transmission path that does not include the second network node. Moreover, an end-to-end connection may comprise the address of the addressee of the message in an address header field while relayed messages may comprise the address of the network node that performs the relay in the addressee header field. For example, the messages received by the second network node may carry the address of the second network node in the address header field and the addressee may then be replaced by the second network node with another addressee, e.g., the first network node or the controller.

In a second implementation form of the first aspect according to the first implementation form of the first aspect or according to the first aspect, the network event is that no control connection to the controller is available or that the control connection to the controller has failed and the information related to the network event comprises control messages of the first network node to the controller.

Thus, it is possible to seamlessly integrate new network nodes into the network or to recover from a failed control connection, as the second network node is enabled to relay the control traffic between the first network node and the controller.

In a third implementation form of the first aspect according to the first or second implementation form of the first aspect or according to the first aspect, the first network node is further configured to update the data flow table of the first network node to send control messages between the first network node and the controller, to the second network node.

Thus, once the second network node explicitly or implicitly agrees to handle the control traffic of the first network node, the first network node may store a respective forwarding rule in the data flow table indicating that control messages intended for the controller are forwarded from the first network node to the second network node. Hence, instead of trying to establish a new end-to-end control connection, the first network node may (temporarily) use an existing (end-to-end) control connection between the second network node and the controller. For example, the first network node may randomly select one of the neighboring network nodes, i.e. network nodes which are connected to the first network node without an intermediary network node. The first neighboring node that either implicitly or explicitly agrees to handle the control traffic of the first network node may then be made a temporary or permanent relay node for the first network node by storing a respective forwarding rule.

In a fourth implementation form of the first aspect according to the third implementation form of the first aspect, the first network node is further configured to send control messages containing an indication of the updated data flow table to the controller via the second network node.

Hence, the controller is enabled to establish or maintain an updated centralized view of all forwarding rules of all network nodes assigned to the controller and may hence decide whether or how to re-design control connection paths. For example, the controller may perform a path optimization algorithm on basis of the available information on all message forwarding paths in the communication network, wherein the path optimization algorithm may, for example, be based on load balancing.

In a fifth implementation form of the first aspect according to any one of the first to fourth implementation forms of the first aspect or according to the first aspect, the control messages between the first network node and the controller contain a unique controller identification.

Adding a unique controller identification to the control messages allows the second network node to decide to which controller a control message is to be forwarded, for example, in case of having active control connections established to more than one controller. Similarly, by assigning a unique identification to the first network node, the process of recognizing by the controller that the relayed control messages originate from the first network node may be made more efficient. Also, it may be easier for the second network node to recognize that received control messages are intended for the first network node. However, the invention is not limited to adding or assigning a unique identification of the first network node to control messages relayed by the second network node, as other mechanisms may be contemplated. For example, the second network node may have a proxy port and may be configured to copy messages received over the proxy port onto a control connection to the controller.

In a sixth implementation form of the first aspect according to any one of the second to fifth implementation forms of the first aspect, the first network node is further configured to determine that the control connection to the controller has failed by using a failure detection protocol to detect a link layer failure.

For example, a link layer failure may be detected by periodically issuing "keepalive" messages between connected ports of neighboring network nodes. The first network node may detect a link layer failure if a number of expected keepalive messages of a third network node over which the first network node sends control messages to the controller is not received within a time frame ruled by the periodicity. In particular, detecting link layer failures allows the first network node to quickly detect that a path over which control messages are routed to the controller is not or no longer available and hence allows for fast establishment of a new control connection and for a fast recovery from a failed control connection, respectively. Moreover, the term "link layer failure" as used throughout the description and claims is intended to be understood broadly and particularly covers a failure or a disconnection of a physical link or a port to which the physical link is connected.

In a seventh implementation form of the first aspect according to any one of the second to sixth implementation forms of the first aspect, the first network node is further configured to send the control messages between the first network node and the controller to a proxy port of the second network node, which indicates that the second network node should forward the control messages without analyzing content of the control messages.

Accordingly, the first network node is enabled to route control messages via the proxy port which relays the control traffic between the first network node and the controller. When transmitting control messages via the proxy port, the control messages may be forwarded to the controller without analyzing the content of the control messages. For example, all messages received at the proxy port may be copied to the control connection between the second network node and the controller by default. In this regard, "analyzing the content of the control message" particularly refers to identifying a source from which the message originates or a destination to which the message is heading by parsing the message content.

In an eighth implementation form of the first aspect according to the first implementation form of the first aspect or according to the first aspect, the condition specified by the controller is the receiving of a specific data packet (e.g. from a specific source node).

In particular, the specific data packet may comprise a header having an indication indicating that the data packet is a control message related to the condition.

According to a second aspect, there is provided a second network node having a data flow table identifying forwarding rules to be applied to incoming data packets. The second network node is configured to allow for manipulation of the data flow table via control messages received via a control connection to a controller. The second network node is further configured to update the data flow table upon receiving: a control message of a first network node intended for the controller or a request for manipulation of the data flow table from the first network node matching a controller-authorized rule of the data flow table of the second network node. The second network node may update the data flow table by establishing a new forwarding rule which rules that control messages of the controller intended for the first network node are forwarded to the first network node.

Accordingly, upon relaying the control traffic of the first network node, the second network node may update its data flow table to reflect the relaying, for example by adding a respective forwarding rule. For example, the second network node may update its data flow table to indicate that control messages of the first network node are forwarded via the control connection of the second network node to the controller, wherein the control connection of the second network node may be an end-to-end connection that was previously only used for handling control traffic of the second network node. Moreover, the second network node may update its data flow table to indicate that control messages of the controller intended for the first network node are forwarded to the first network node.

Furthermore, the data flow table may be updated by the first network node without explicit intervention by the controller. Thus, a decision at an instant at which a flow table is to be updated can be made locally and thus faster.

In a first implementation form of the second aspect, the second network node is further configured to send a control message containing an indication of the updated data flow table to the controller.

Hence, as discussed above, the controller is enabled to maintain an updated centralized view of all forwarding rules of all network nodes assigned to the controller and may hence be enabled to decide, for example, whether or how to re-design control connection paths.

In a second implementation form of the second aspect according to the first implementation form of the second aspect or according to the second aspect, the control messages of the first network node to the controller contain a unique controller identification.

As discussed above, having a unique controller identification allows the second network node to decide to which controller a control message is to be forwarded, for example, in case of having active control connections established to more than one controller. Similarly, by having a unique identification of the first network node, the process of recognizing by the controller that the relayed control massages originate from the first network node may be made more efficient.

Also, it may be easier for the second network node to recognize that received control messages are intended for the first network node. However, the invention is not limited to adding or assigning a unique identification of the first network node to control messages relayed by the second network node, as other mechanisms may be contemplated. For example, the second network node may have a proxy port and may be configured to copy each message received over the proxy port onto a control connection to the controller.

In a third implementation form of the second aspect according to the first or second implementation forms of the second aspect or according to the second aspect, the second network node is further configured to update the data flow table in regard to forwarding data traffic to or from the first network node in response to the request for manipulation of the data flow table.

Hence, as indicated above, control messages of the first network node which are intended for the SDN controller may be routed/re-routed to the second network node which then handles the control traffic of the first network node. This allows to seamlessly integrate new network nodes into the network or to recover from a failed control connection, as the second network node can relay the control traffic between the first network node and the controller.

According to a third aspect, there is provided a communication network comprising a first network node and a second network node. Each network node has a data flow table identifying forwarding rules to be applied to incoming data packets. The communications network further includes a controller. Each of the first network node and the second network node is configured to allow for manipulation of the data flow table via control messages received via a control connection to the controller. The first network node is further configured to: determine an occurrence of a network event or compliance with a condition specified by the controller, establish a control connection to the second network node in case that the network event occurs or the condition is met, and to exchange control messages with the second network node via the control connection.

Thus, as discussed above, network reconfiguration may be accelerated by network-node-initiated exchanging of control messages between the network nodes, for example, if the controller is located remotely from a reconfiguration site.

In a first implementation form of the third aspect, the first network node is further configured to use the second network node to relay information from the first network node to the controller, the information being related to the network event, or to send to the second network node a controller-authorized request for manipulation of the data flow table of the second network node, wherein the second network node is further configured to update the data flow table of the second network node upon matching the controller-authorized request from the first network node to a controller-authorized rule of the data flow table of the second network node.

Hence, as discussed above, the second network node may relay control traffic between the first network node and the controller. Thus, the second network node may copy control messages received from the first network node to an existing (end-to-end) control connection between the second network node and the controller. Moreover, control messages of the controller intended for the first network node may be sent from the controller to the second network node using the control connection between the controller and the second network node.

The second network node may forward the control messages intended for the first network node to the first network node. In particular, the control connection between the second network node and the controller may be a control connection which is different from a failed control connection between the first network node and the controller or which has been established before the first network node is integrated into the network and is (physically) connected to the second network node.

In a second implementation form of the third aspect according to the first implementation form of the third aspect or according to the third aspect, the network event is that no control connection to the controller is available or that the control connection to the controller has failed and the information related to the network event comprises control messages of the first network node to the controller.

Hence, as discussed above, control messages of the first network node which are intended for the SDN controller may be routed/re-routed to the second network node which then handles the control traffic of the first network node. This allows to seamlessly integrate new network nodes into the network or to recover from a failed control connection, as the second network node can relay the control traffic between the first network node and the controller. Moreover, relaying may proceed until the controller chooses a new path for the control connection between the first network node and the controller or confirms the existing path as the new path for the control connection between the first network node and the controller.

In a third implementation form of the third aspect according to the first or second implementation form of the third aspect or according to the third aspect, the second network node comprises a proxy port and is configured to forward data packets received at the proxy port to the controller without analyzing a content of the data packets received at the proxy port.

Accordingly, as discussed above, the first network node may detect that the second network node comprises a dedicated proxy port which allows for relaying control traffic between the first network node and the controller. Upon transmitting control messages to the proxy port, the control messages may be forwarded to the controller without analyzing the content of the control messages. For example, all messages received at the proxy port may be copied by default to the control connection between the second network node and the controller.

In a fourth implementation form of the third aspect according to any one of the first to third implementation forms of the third aspect or according to the third aspect, the second network node is further configured to update its data flow table, to forward control messages of the first network node to the controller and/or to update its data flow table to forward control messages of the controller intended for the first network node, to the first network node.

Thus, as discussed above, upon relaying the control traffic of the first network node, the second network node may update its data flow table to reflect the relaying. For example, the second network node may update its data flow table to indicate that control messages of the first network node are forwarded via a control connection of the second network node to the controller.

Moreover, the second network node may update its data flow table to indicate that control messages of the controller intended for the first network node are forwarded to the first network node. Accordingly, the second network node may automatically adapt its data flow table without intervention of the controller to reflect its relaying status with respect to control messages exchanged between the first network node and the controller. Thus, despite being managed by the controller, the data flow table of the second network node may be automatically adapted to allow for control data relaying.

In a fifth implementation form of the third aspect according to the fourth implementation form of the third aspect, the second network node is further configured to send a control message containing an indication of the updated data flow table to the controller.

Hence, as discussed above, the controller is enabled to maintain an updated centralized view of all forwarding rules of all network nodes assigned to the controller and may hence be enabled to decide, for example, whether or how to re-design control connection paths.

In a sixth implementation form of the third aspect according to the fifth implementation form of the third aspect, the controller is configured to receive the control messages containing an indication of the updated data flow table of the first network node, to perform a path optimization algorithm on basis of the received indications, and to manipulate the data flow table of the first network node for the first network node to send control messages of the first network node to the controller, to a third network node.

Accordingly, the controller may use the indications with respect to the updated data flow tables as a starting point for performing a path optimization algorithm on basis of which the data flow table of the first network node may be updated via a control message relayed by the second network node to establish a new control connection to the controller via a third network node. Moreover, the data flow table of the second network node may be updated to no longer relay control messages between the first network node and the controller. However, in another implementation form, the data flow table of the second network node may be maintained to provide for path redundancy in case that the newly established control connection fails and the first network node is forced to (again) communicate control messages to the controller via the second network node.

In a seventh implementation form of the third aspect according to any one of the first to sixth implementation forms of the third aspect or according to the third aspect, the control messages of the first network node to the controller contain a unique controller identification.

As discussed above, having a unique controller identification allows the second network node to decide to which controller a control message is to be forwarded, for example, in case of having active control connections between the second network node and more than one controller. Similarly, by having a unique identification of the first network node, the process of recognizing by the controller that the relayed control massages originate from the first network node may be made more efficient. Also, it may be easier for the second network node to recognize that received control messages are intended for the first network node. However, the invention is not limited to adding or assigning a unique identification of the first network node to the control messages relayed by the second network node, as other mechanisms may be contemplated. For example, the second network node may have a proxy port and may be configured to copy each message received over the proxy port onto a control connection to the controller.

In an eighth implementation form of the third aspect according to any one of the first to seventh implementation forms of the third aspect or according to the third aspect, the condition specified by the controller is the receiving of a specific data packet from a specific source node.

In particular, as stated above, the data packet may be specific by having an indication in its header indicating that the data packet is a control message related to the condition.

According to a fourth aspect, there is provided a method in a communication network comprising a first network node and a second network node. Each of the first and second network node has a data flow table identifying forwarding rules to be applied to incoming data packets and are configured to allow for manipulation of the data flow table via control messages received via a control connection to a controller of the communication network. The method further includes determining an occurrence of a network event or compliance with a condition specified by the controller, establishing a control connection between the first network node and the second network node, and exchanging control messages with the second network node via the control connection.

Thus, as indicated above, network reconfiguration may be accelerated by network-node-initiated exchanging of control messages between the network nodes.

According to a fifth aspect, there is provided a method of relaying control messages of a first network node in a communication network. The first network node has a data flow table identifying forwarding rules to be applied to incoming data packets and allowing for manipulation of the data flow table via control messages received via a control connection to a controller. The method includes determining that no control connection to the controller is available or that the control connection to the controller has failed, establishing a connection to a second network node, and sending control messages of the first network node to the controller to the second network node via the established connection.

Hence, as discussed above, control messages of the first network node which are intended for the controller can be routed/re-routed to the second network node which then handles the control traffic of the first network node. This allows to integrate new network nodes into the network or to recover from a failed control connection, as the second network node relays the control traffic between the first network node and the controller.

According to a sixth aspect, there is provided a method of forwarding control messages of a first network node in a communication network by a second network node having a data flow table identifying forwarding rules to be applied to incoming data packets. The second network node allows for manipulation of the data flow table via control messages received via a control connection to a controller. The method includes forwarding, by the second network node, control messages of the first network node to the controller.

Accordingly, the second network node may use its control connection to the controller which is originally only used to handle the control traffic of the second network node to allow the first network node to gain or regain a transmission path for exchanging control messages with the controller.

These and other aspects of the invention will be apparent from the embodiments described below.

BRIEF DESCRIPTION OF THE DRAWINGS

Several embodiments of the present invention will now be described by way of example only, with reference to the accompanying drawings in which.

DETAILED DESCRIPTION OF ILLUSTRATIVE EMBODIMENTS

Figure 1:
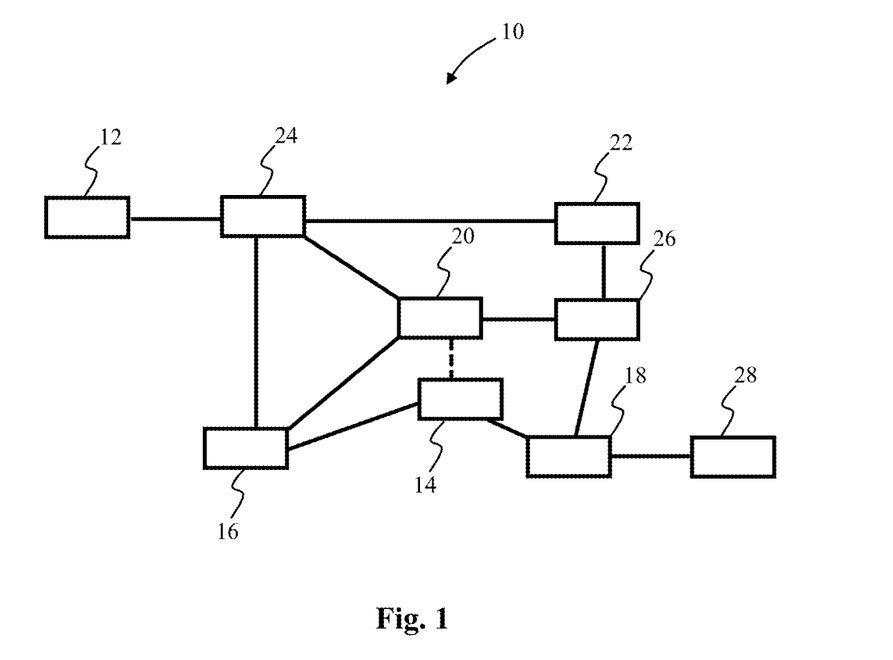
FIG. 1 is an illustration of a communication network in which aspects of the invention may be implemented.

The communication network 10 shown in FIG. 1 comprises an (SDN) controller 12 and a plurality of network nodes 14-28 which are interconnected by a plurality of links. The network nodes 14-28 may comprise a non-transitory memory and a processor. The processor may execute instructions stored in the memory to execute process steps involving the network nodes 14-28. Some or all of the network nodes 14-28 may be switches, e.g., Ethernet switches. Each of the network nodes 14-28 has a data flow table stored in its memory identifying forwarding rules to be applied to available data packets. Available data packets may be data packets received over a network connection or data packets produced by the network node 14-28. Each available data packet is matched against the forwarding rules and if a matching forwarding rule is identified, the data packet is forwarded to a neighboring network node 14-28 as indicated by the matching forwarding rule. Moreover, the forwarding rules may be part of a rule set which determines actions to be performed on each available data packet.

As shown in FIG. 1, the network nodes 14-28 are connected to each other by a plurality of physical links such as cables or wires or an air interface over which data packets may be transmitted using a wireless transmission protocol. In this regard, it is to be noted that although FIG. 1 only shows one particular link between connected network nodes 14-28, the network nodes 14-28 may comprise a multitude of ports and each link may enable a plurality of connections, wherein each connection may connect ports of two different network nodes 14-28. For example, as shown in FIG. 1, a first network node 14 may be connected to a second network node 16 as well as to a third network node 18 neighboring the first network node 14.

The first network node 14 may maintain an end-to-end control connection to the controller 12. In an example, the transmission path of the control connection may involve network nodes 20 and 24. The transmission path of the control connections may be defined by referring to the ports of the involved network nodes 20 and 24 through which control messages are passed. Moreover, the second network 16 node may also maintain an end-to-end control connection to the controller 12. In an example, the transmission path of the control connection may involve network node 24. The control connections allow the controller 12 to issue control messages to the network nodes 14 and 16 to manipulate the data flow tables of the network nodes 14 and 16. All connections including the control connections may be initially ruled by the controller 12 so that there may be a time instant at which the controller 12 is aware of each path via which messages are transmitted in the communication network 10.

As suggested in existing SDN technology, the intermediate network nodes act as pure packet forwarding elements in the control connection between the controller and the network node. The intermediate network nodes are not aware of the content of the control messages exchanged between the controller and network node. Therefore, there is no control connection between the network nodes. In an embodiment, a control connection always exists between a control and a network node. However, the present application provides embodiment implementations of control connections between network nodes and provides how these control connections benefit the SDN network.

When a link connecting the first network node 14 and network node 20 fails, as indicated by the broken line in FIG. 1, the control connection between the first network node 14 and the controller 12 may fail, too. In response to detecting that the control connection between the first network node 14 and the controller 12 fails, the first network node 14 may select the second network node 16 from the available neighboring network nodes 16 and 18 and transmit its control messages to the second network node 16 for relaying.

The second network node 16 may receive the control messages of the first network node 14 over a dedicated proxy port or may determine by parsing the received control messages that the control messages are destined for the controller 12. The second network node 16 may then transmit the control messages to the controller 12 via its control connection. Accordingly, there is a time instant at which the controller 12 which is initially aware of each path via which messages are transmitted in the communication network 10, receives control messages over a path that it is not aware of. Thus, the first network node 14 may make the decision how to deal with the failed control connection locally, without involvement of the controller 12.

Hence, the first network node 14 may open a local connection to the neighboring second network node 16 instead of trying to open a new control connection to the controller 12 end-to-end and may use the local connection to the neighboring second network node 16 to send and receive its control traffic. If the connection to the second network node 16 fails, e.g. due to a physical link or port failure, the first network node 14 might open a new connection to the third network node 18 to reach the controller 12 via the third network node 18 that relays the control traffic between the first network node 14 and the controller 12 (recovery strategy). Alternatively, the first network node 14 might seamlessly start using an already existing alternative connection (protection strategy) for its control traffic, for example by maintaining an active connection to the third network node 18 which may then start to relay the control traffic between the first network node 14 and the controller 12.

Moreover, in addition to recovering or protecting the first network node 14 from a failed control connection, relaying of control traffic by the second network node 16 may also be practiced when initially adding the first network node 14 to the communication network 10. For example, when initially adding the first network node 14 to the communication network 10, the first network node 14 may need to establish a control connection to the controller 12 to make the controller 12 aware of its existence and to allow the controller 12 to integrate the first network node 14 into the system by adding forwarding rules to the data forwarding tables of the network nodes 14-28 to make the first network node 14 reachable. However, instead of trying to establish a new control connection (end-to-end) with the controller 12, the first network node 14 may send its control messages to the second network node 16 which may relay the control traffic between the first network node 14 and the controller 12 as discussed above. The controller 12 may then modify the forwarding rules of network nodes 24 and 20 to establish an (end-to-end) control connection between the controller 12 and the first network node 14 via the network nodes 24 and 20. Moreover, the controller 12 may modify the forwarding rules of some or all network nodes 14-28 to integrate the first network node 14 into the network 10.

In the following, an implementation example of aspects of the invention in a modified OpenFlow communication network is described with reference to FIGS. 2 to 4.

Figure 2:
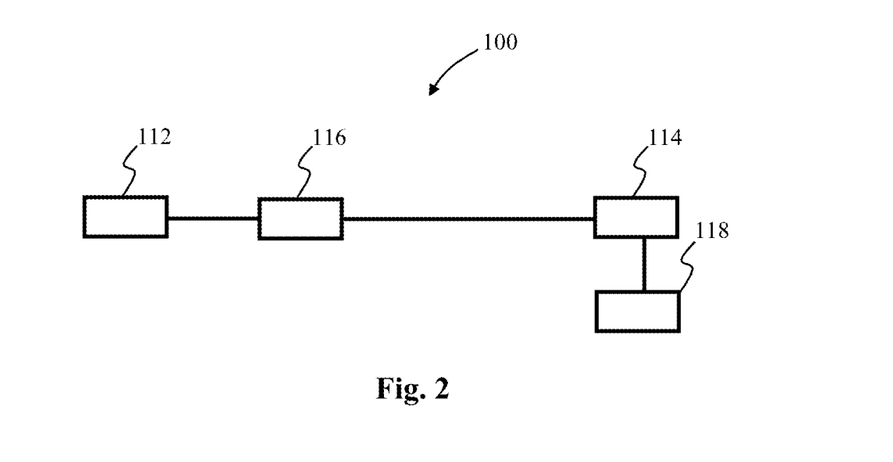
FIG. 2 schematically illustrates a modified OpenFlow communication network in which aspects of the invention may be exemplarily implemented.

FIG. 2 illustrates a modified OpenFlow communication network 100 comprising a controller 112 to which network nodes (switches 114, 116 and 118) are added. Please note that the existing OpenFlow specification (cf. the "OpenFlow Switch Specification. Version 1.5.1." Available at: https://www.opennetworking.org/images/stories/downloads/sdn-resources/onf-specifications/openflow/openflow-switch-v1.5.1.pde only requires configuring network nodes with the controller DNS or IP address (IPC hereafter). Additionally, a non-standard TCP port can be specified. Accordingly, it is necessary to configure data flow tables in form of IP routing tables in the switches 114, 116 and 118 such that they can send IP packets to the controller 12 and get back IP packets from the controller 12. In standard OpenFlow communication networks, this requirement can, for example, be met by a static manual routing preconfiguration or by performing an additional, preliminary to OpenFlow mechanism, to fetch some initial configuration for IP forwarding for all switches. This mechanism in turn should not rely on IP routing, which might not yet be established.

In the modified OpenFlow communication network 100 of FIG. 2, static manual routing preconfiguration or an additional, preliminary to OpenFlow mechanism, to fetch some initial configuration for IP forwarding for all switches, is avoided by employing the principles described above as will be explained in more detail in the following. The OpenFlow communication network 100 comprises a first switch 114 connected to a second switch 116 which is connected to the controller 112. As the second switch 116 is directly connected to the controller 112, the path to the controller 112 is directly available as a local IP network prefix route when the switch interface of the second switch 116 is brought up and initialized. So, in this case, no IP routing table initialization is required in the second switch 116. The first switch 114 which is directly connected to the second switch 116 but not to the controller 112 may follow the above described process to open a connection to the neighboring second switch 116 and use it for relaying its control traffic. Again, the IP routing table of the first switch 114 does not need to be initialized in advance.

When a switch 114, 116 or 118 connects to a neighbor, be it the controller 112 or another switch 118, 116 or 114, it may exchange a "Hello message" with the controller 112. Upon receiving a "Hello" message from the first switch 114, the controller 112 may write down the interface on which this message arrived, i.e. the second switch 116 which relayed the message. As a result, the second switch 116 may be used to relay future messages to the first switch 114. When the second switch 116 routes a control message of switch 118 which has been received from the first switch 114, switch 116 may add an entry to its data flow table, indicating that the first switch 114 is to be used to reach switch 118. Thus, when the controller 112 sends a control message intended for switch 118 which reaches the second switch 116, the second switch 116 will use this routing entry to relay this message to the first switch 114. The same may happen at the first switch 114, too.

Figure 3:
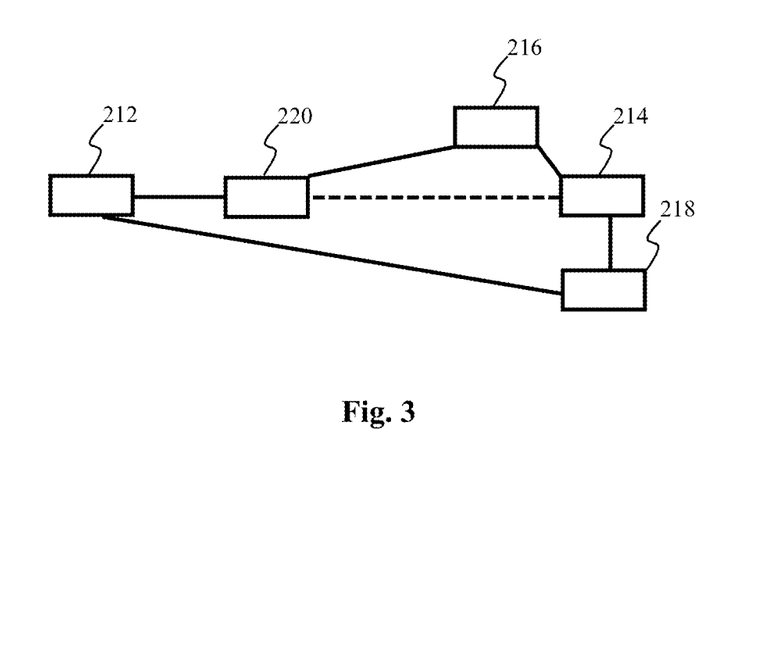
FIG. 3 schematically illustrates another modified OpenFlow communication network in which aspects of the invention may be exemplarily implemented.

FIG. 3 illustrates a further modified OpenFlow communication network 200 comprising a controller 212 to which network nodes (switches 214, 216 and 218) are connected.

In particular, a first switch 214 is connected with an intermediary switch 220 to exchange control messages end-to-end with the controller 212 via the intermediary switch 220. If the link between the first switch 214 and the intermediary switch 220 fails as indicated by the dotted line in FIG. 3, the first switch 214 may establish a connection to a neighboring switch 216 or 218, such as the second switch 216 and continue sending its control traffic via the second switch 216. Moreover, the first switch 214 may pre-setup and maintain a number of other connections in addition to the direct connection to the intermediary switch 220 and start using them as soon as the mentioned failure is detected. For example, the first switch 214 may randomly select one of its neighboring switches 216 or 218 (or connections to them) to use for relaying control traffic. Moreover, weight values may be communicated upon connection establishment with the neighboring switches 216 or 218 and are used to rank neighboring switches and the best among them may be selected. For example, the weight values may be calculated on basis of a number of neighboring switches to which a switch is connected.

Moreover, as soon as the intermediary switch 220 notices that the control traffic of the first switch 214 is routed via the second switch 216, it may update its data flow table accordingly. Furthermore, if the controller 212 receives a control message from the first switch 214 through a different switch than before, it may interpret this as an indication that there has been a change of the topology and that the control traffic intended for the first switch 214 uses a different path. The controller 212 may react in various ways to this information. For example, the controller 212 may simply update its data flow table, and use the new path to send the control traffic to the first switch 214. Moreover, the controller 212 may recalculate the paths in the modified OpenFlow communication network 200 and send a control message to the first switch 214 ordering the first switch 214 to use a different neighboring switch such as switch 218 (rather than switch 216) to exchange control messages with the controller 212. This may be beneficial as a periodic path correction task to run in order to correct possible inefficiencies of paths automatically selected by the switches 214-220 without controller involvement.

Furthermore, to detect the link failure or a port failure at the intermediary switch 220, protocols such as Bidirectional Forwarding Detection (BFD) may be locally used by the first switch 214 and the intermediary switch 220 to make a failure quickly detectable (e.g., using keepalive timers and retransmissions of keepalive messages).

In the communication networks 10, 100 and 200 of FIG. 1-3, messages may comprise a header including two unique identifiers, the identifiers identifying a source and a destination of the message. For example, each OpenFlow data packet or message sent between the controller 112 or 212 and any one of the switches 114-118 and 214-220, respectively, may comprise the following modified OpenFlow packet or message header having a unique source identifier and a unique destination identifier:

```
/* Header on all Open-Flow packets. */
struct ofp_header {
    uint8_t version;      /* OFP_VERSION. */
    uint8_t type;         /* One of the OFPT_ constants. */
    uint16_t length;      /* Length including this ofp_header. */
    uint32_t xid;         /* Transaction id associated with _ */
    uint32_t source_id;   /* Source node ID. */
    uint32_t dest_id;     /* Destination node ID. */
};
OFP_ASSERT(sizeof(struct ofp_header) == 16);
```

Thus, control messages exchanged between the controller 112 or 212 and any one of the network node 14-28, the switches 114-118 and the switches 214-220, respectively, may comprise a unique controller identifier and a unique network node or switch identifier:

In the modified OpenFlow networks 100 and 200, modified OpenFlow clients such as the switches 114-118 and 214-220 may act as OpenFlow proxies (or agents) configured to relay received OpenFlow messages from the switches 114-118 and 214-220 to the controller 112 or 212 and from the controller 112 or 212 back to the actual destinations as described above. In this regard, a possible operation of a control connection setup is described with reference to the modified OpenFlow network 300 of FIG. 4.

Figure 4:
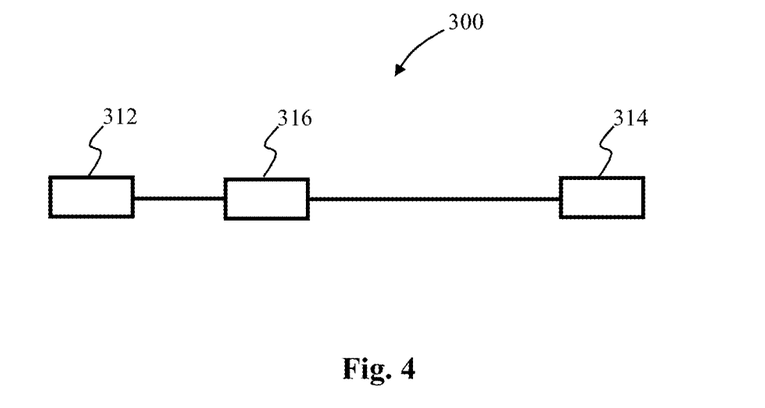
FIG. 4 schematically illustrates another modified OpenFlow communication network in which aspects of the invention may be exemplarily implemented.

In the modified OpenFlow network 300 of FIG. 4, a first switch 314 opens a TCP connection on a well-defined OpenFlow port, e.g. 6654, wherein the payload is an OpenFlow message with the modified header described above. The neighboring second switch 316 which receives the OpenFlow message checks the destination identifier (dest_id) from the modified header of the received OpenFlow message and redirects the OpenFlow message to its own connection towards the destination which is the controller 312. Thus the second switch 316 uses its own, presumably existing, connection to the controller 312 to handle the OpenFlow traffic from the neighboring first switch 314.

In order to support secure end-to-end channels (for example, TLS in the OpenFlow specifications), where intermediate switches such as the second switch 316 need not or even cannot read the transported OpenFlow messages by design, a proxy port may be used. The proxy port may be a reserved TCP port of the second switch 316 which acts as OpenFlow proxy (or agent). The OpenFlow proxy (or agent) may support the proxy port by being configured to listen on the proxy port for an incoming TCP connection open request. Upon an incoming TCP connection open request, the OpenFlow proxy (or agent) may be configured to establish a TCP connection and to copy data from the established TCP connection to the existing control connection to the controller 312. Thus, the OpenFlow proxy (or agent) may act as a TCP proxy or TCP to TLS proxy for the requesting first switch 314.

Figure 5:
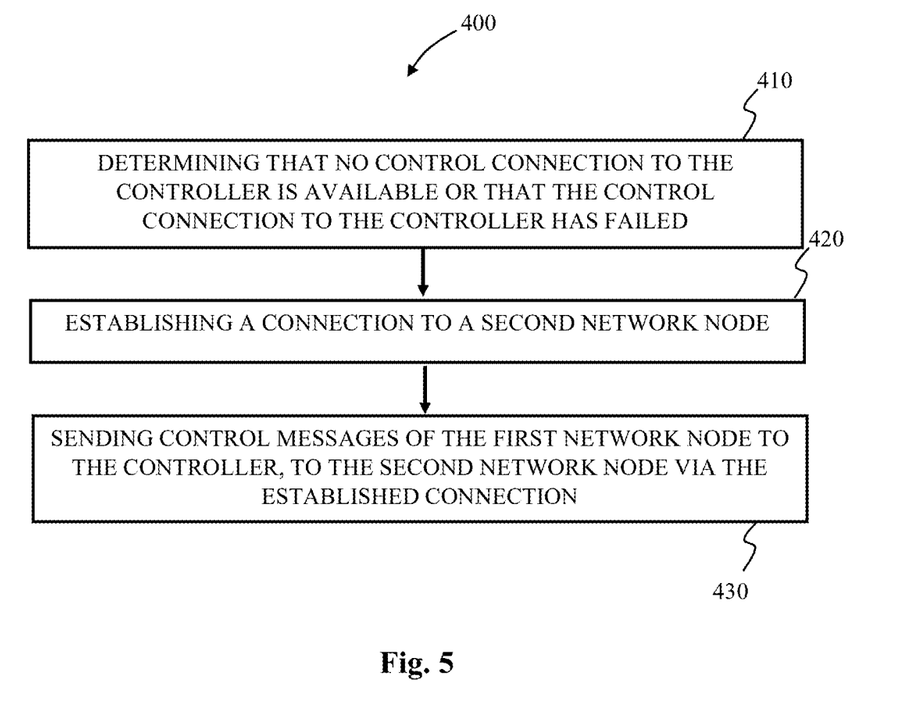
FIG. 5 illustrates a flow diagram of a process implemented in the communication network.

FIG. 5 illustrates a process 400 of relaying control messages of the first network node 14 (or switch 114, 214, 314) in one of the communication networks 10, 100, 200, 300, wherein the first network node 14 (or switch 114, 214, 314) has a data flow table identifying forwarding rules to be applied to incoming data packets and allowing for manipulation of the data flow table via control messages received via a control connection to the controller 12 (or 112, 212 or 312). At 410, the first network node 14 (or switch 114, 214, 314) determines that no control connection to the controller 12 (or 112, 212 or 312) is available or that the control connection to the controller 12 (or 112, 212 or 312) has failed. The process continues at 420 with establishing an end-to-end connection to the second network node 16 (or switch 116, 216, 316). Finally, at 430, the process ends with sending control messages of the first network node 14 (or switch 114, 214, 314) to the controller 12 (or 112, 212 or 312), to the second network node (or switch 116, 216, 316) via the established connection.

Figure 6:
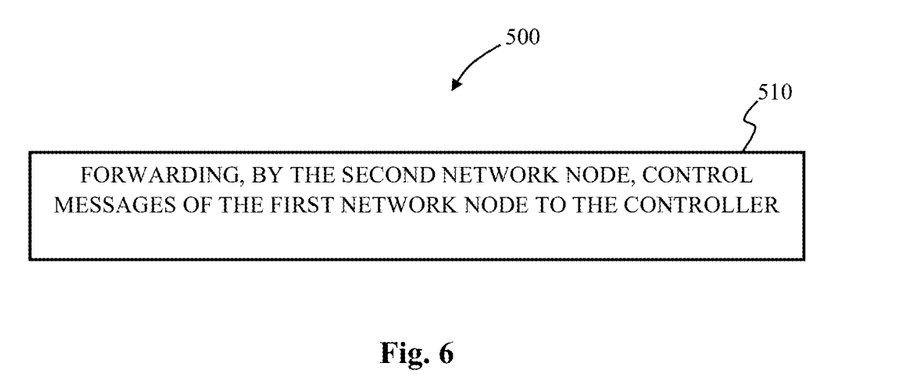
FIG. 6 illustrates a flow diagram of a another process implemented in the communication network.

FIG. 6 illustrates a process 500 of forwarding control messages of the first network node 14 (or switch 114, 214, 314) in the communication network 10 (or 100, 200, 300) by the second network node 16 (or switch 116, 216, 316) having a data flow table identifying forwarding rules to be applied to incoming data packets, wherein the second network node 16 (or switch 116, 216, 316) allows for manipulation of the data flow table via control messages received via a control connection to the controller 12 (or 112, 212 or 312). At 510, the second network node (or switch 116, 216, 316) forwards control messages of the first network node 14 (or switch 114, 214, 314) received over a (end-to-end) connection between the first network node 14 (or switch 114, 214, 314) and the second network node to the controller 12 (or 112, 212 or 312).

Figure 7:
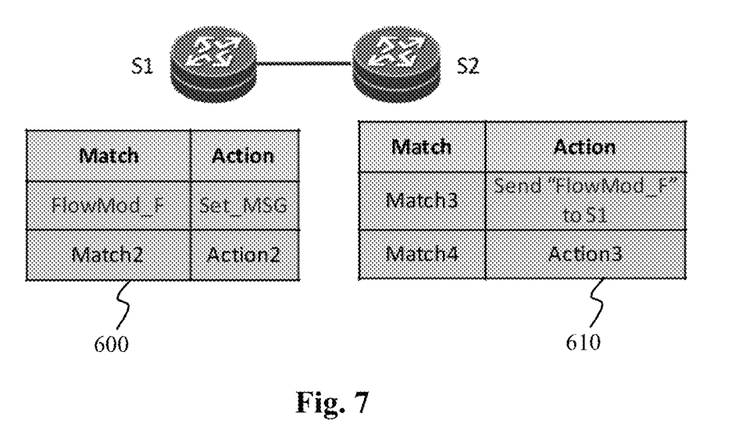
FIG. 7 shows exemplary data flow tables of two switches.

FIG. 7 shows two physically connected network nodes, e.g., modified OpenFlow switches S1 and S2, along with their data flow tables 600 and 610. The data flow table 610 of S2 contains a data flow entry that indicates that on receiving a packet that matches "Match3" (which can be arbitrary) the action "Send FlowMod_F to S1" should be executed. Thus, switch S2 may send a data flow rule to switch S1 when a network event happens (e.g. a packet that matches on "Match3").

When switch S1 receives FlowMod_F from switch S2, the first data flow rule in its data flow table fires. This data flow rule tells that switch S1 should store the received FlowMod (data flow rule) in its data flow table and start using it just as the other data flow rules. In this regard, it is to be noted that although switch S1 and switch S2 are shown in FIG. 7 as being physically connected, the concept is not limited thereto and the switches S1 and S2 may be remote and communicate with each other via intermediary network nodes such as intermediary switches. Rather, switch S2 may send a data flow rule to switch S1 and switch S1 may use that data flow rule as coming from the controller.

Moreover the first data flow rule in the flow table 600 of switch S1 is not required, although it may help to resolve potential security problems. In addition, all data flow rules in the data flow tables 600, 610 may originate from the controller. Accordingly, no control logic run may be required in the first and second switch S1, S2. Hence, the switches S1 and S2 may be maintained to be forwarding devices which just match packets and execute rules when a match happens. Moreover, switch S2 may store a data flow entry priority update action and send it to switch S1 when Match3 occurs. S1 may then change a flow rule priority upon receiving the message from switch S2.

Figure 8:
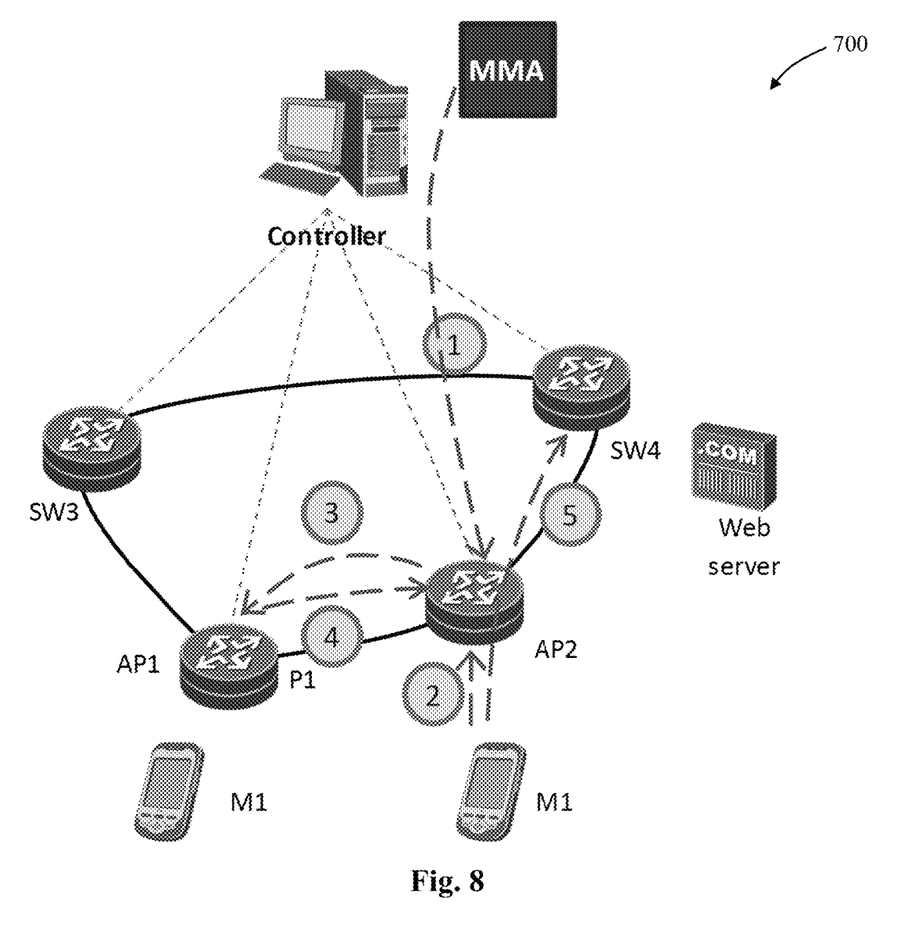
FIG. 8 schematically illustrates another modified OpenFlow communication network in which aspects of the invention may be exemplarily implemented.

FIG. 8 schematically illustrates another modified Open-Flow communication network 700 in which the concept described with regard to FIG. 7 may be exemplarily implemented. While a mobile node M1 is attached to a second network node such as access point AP1 (which may be a switch), a mobility management application (MMA) taking up the role of the controller may pre-configure a data flow rule at a first network node such as neighboring access point AP2 (which may also be a switch) to send a FlowMod to AP1. This FlowMod may instruct AP1 to forward the DL traffic of M1 to AP2. The MMA may also install a data flow rule at AP2 that forwards M1 uplink traffic to another network node such as switch SW4. In AP1, the MMA may install a rule that matches on the packets from AP2 and as action installs the requested data flow rule.

When M1 is handed-over to AP2, the FlowMod transfer to AP1 may be triggered. Thus, the FlowMod may be sent to AP1. AP1 may then store it in its flow table. Accordingly, further downlink packets for M1 flow from AP1 to AP2 due to the newly installed data flow rule. Moreover, uplink traffic of M1 may be forwarded to SW4. Thus, the uplink traffic may follow the new path. Accordingly, the controller may offload handling steps of the handover of mobile nodes to the access points (e.g., switches). Thus a better performance, a higher level of programmability may be achieved and computing cycles of the controller may be saved. Moreover, the system arrived at may assumes slightly different hardware abstraction of the underlying switches, but offers a broader range of possibilities to program control applications and save controller's resources.

Figure 9:
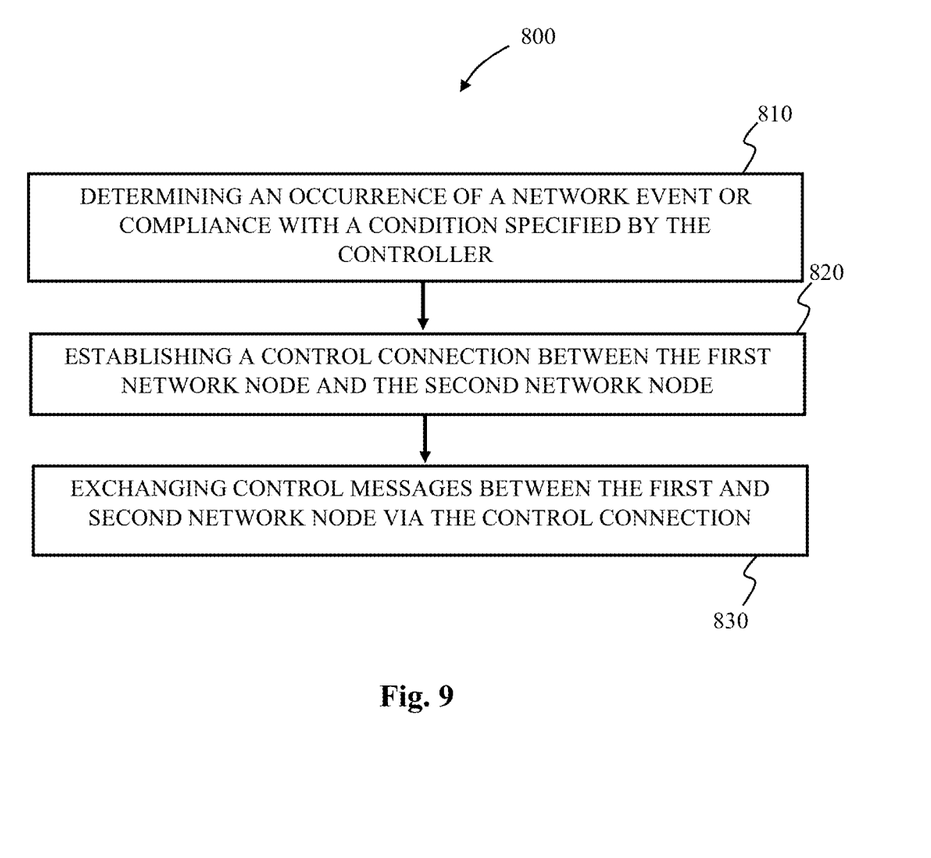
FIG. 9 illustrates a flow diagram of another process implemented in the communication networks.

FIG. 9 illustrates a process 80o in one of the communication networks 10, 100, 200, 300, 700, comprising the first network node 14 (or switch 114, 214, 314, AP2) and the second network node 16 (or switch 116, 216, 316, AP1), wherein each of the first network node 14 (or switch 114, 214, 314, AP2) and the second network node 16 (or switch 116, 216, 316, AP1) has a data flow table identifying forwarding rules to be applied to incoming data packets and allowing for manipulation of the data flow table via control messages received via a control connection to the controller 12 (or 112, 212, 312, MMA). At 81o, an occurrence of a network event (e.g., control connection failure) or compliance with a condition (e.g., handover) specified by the controller 12 (or 112, 212, 312, MMA) is detected. At 820, a (end-to-end) control connection between the first network node 14 (or switch 114, 214, 314, AP2) and the second network node 16 (or switch 116, 216, 316, AP1) is established. Finally, at 830, control messages between the first network node 14 (or switch 114, 214, 314, AP2) and the second network node 16 (or switch 116, 216, 316, AP1) node are exchanged via the control connection.

What is claimed is:

1. A first network node comprising:
   a processor; and
   a non-transitory computer readable storage medium storing a data flow table identifying forwarding rules to be applied to incoming data packets, the non-transitory computer readable storage medium further storing a program for execution by the processor, the program including instructions to:
   allow for manipulation of the data flow table via first control messages received via a first control connection to a controller;
   determine an occurrence of a network event or compliance with a condition specified by the controller;
   establish a second control connection to the controller through a second network node when the network event occurs or when the condition is met, wherein the first network node is connected to the second network node through a network connection prior to establishing the second control connection, and wherein the network connection is not a control connection that allows transmission of control messages for manipulating the data flow table of the first network node; and
   exchange second control messages with the controller via the second control connection through the second network node.

2. The first network node of claim 1, wherein the instructions further comprise instructions to:
   use the second network node to relay information from the first network node to the controller, the information being related to the network event; or
   send, to the second network node, a controller-authorized request for manipulation of a data flow table of the second network node.

3. The first network node of claim 1, wherein the network event is that no control connection to the controller is available or that the control connection to the controller has failed.

4. The first network node of claim 1, wherein instructions further comprise instructions to update the data flow table of the first network node to send the second control messages between the first network node and the controller via the second control connection.

5. The first network node of claim 4, wherein the instructions comprise further instructions to send third control messages containing an indication of the updated data flow table to the controller via the second control connection.

6. The first network node of claim 1, wherein the second control messages between the first network node and the controller contain a unique controller identification.

7. The first network node of claim 1, wherein the instructions comprise further instructions to send the second control messages between the first network node and the controller to a proxy port of the second network node, wherein the proxy port of the second network node indicates that the second network node should forward the second control messages between the first network node and the controller without analyzing content of the second control messages between the first network node and the controller.

8. The first network node of claim 1, wherein the condition specified by the controller is receiving of a specific data packet from a specific source node.

9. The first network node of claim 1, wherein the first network node remains connected to the second network node via the network connection after establishing the second control connection.

10. A second network node comprising:
a processor; and
a non-transitory computer readable storage medium storing a data flow table identifying forwarding rules to be applied to incoming data packets, the non-transitory computer readable storage medium further storing a program for execution by the processor, the program including instructions to:
allow for manipulation of the data flow table via first control messages received via a first control connection to a controller; and
update the data flow table, wherein the second network node updates the data flow table by establishing a new forwarding rule which rules that third control messages of the controller intended for a first network node are forwarded to the first network node, wherein the first network node is connected to the second network node through a network connection prior to updating the data flow table, and wherein the network connection is not a control connection that allows transmission of control messages for manipulating the data flow table of the first network node, and wherein updating the data flow table is upon receiving:
a second control message of a first network node intended for the controller; or
a request for manipulation of the data flow table from the first network node matching a controller-authorized rule of the data flow table of the second network node.

11. The second network node of claim 10, wherein the instructions comprise further instructions to send a fourth control message containing an indication of the updated data flow table to the controller.

12. The second network node of claim 10, wherein the instructions comprise further instructions to in response to the request for manipulation of the data flow table, update the data flow table regarding forwarding data traffic to or from the first network node.

13. A communication network, comprising:
a first network node having a first data flow table identifying forwarding rules to be applied to incoming data packets of the first network node;
a second network node having a second data flow table identifying forwarding rules to be applied to incoming data packets of the second network node; and
a controller;
wherein the first network node is configured to allow for manipulation of the first data flow table via first control messages received via a first control connection to the controller;
wherein the second network node is configured to allow for manipulation of the second data flow table via second control messages received via a second control connection to the controller;
wherein the first network node is further configured:
to determine an occurrence of a network event or compliance with a condition specified by the controller;
to establish a third control connection to the controller through the second network node when the network event occurs or the condition is met; and
to exchange third control messages with the controller through the second network node via the third control connection, wherein the first network node is connected to the second network node through a network connection prior to establishing the second control connection, and wherein the network connection is not a control connection that allows transmission of control messages for manipulating the first data flow table of the first network node.

14. The communication network of claim 13, wherein the first network node is further configured:
to use the second network node to relay information from the first network node to the controller, the information being related to the network event; or
to send to the second network node a controller-authorized request for manipulation of the second data flow table of the second network node, wherein the second network node is further configured to update the second data flow table of the second network node upon matching the controller-authorized request from the first network node to a controller-authorized rule of the second data flow table of the second network node.

15. The communication network of claim 14, wherein the controller is configured:
to receive a control message containing an indication of an updated data flow table of the first network node;
to perform a path optimization algorithm on basis of the received indication; and
to manipulate the first data flow table of the first network node, for the first network node to send control messages of the first network node to the controller, to a third network node.

16. A method, comprising:
storing, by a first network node, a data flow table identifying forwarding rules to be applied to incoming data packets;
allowing, by the first network node, for manipulation of the data flow table via first control messages received via a first control connection to a controller of a communication network, the first network node being in a communication network;
determining, by the first network node, an occurrence of a network event or compliance with a condition specified by the controller;
establishing, by the first network node, a second control connection between the first network node and the controller through a second network node in the communication network wherein the first network node is connected to the second network node through a network connection prior to establishing the second control connection, and wherein the network connection is not a control connection that allows transmission of control messages for manipulating the data flow table of the first network node; and
exchanging second control messages between the first network node and the controller through the second network node via the second control connection.

17. The method of claim 16, wherein the second network node forwards the second control messages to the controller via a third control connection between the second network node and the controller, and wherein the third control connection is established prior to the second control connection.

* * * * *